United States Patent [19]

Müller

[11] Patent Number: 4,626,932
[45] Date of Patent: Dec. 2, 1986

[54] ROTATING VIDEO HEAD SWITCHING CONTROL SYSTEM

[75] Inventor: Jürgen Müller, Griesheim, Fed. Rep. of Germany

[73] Assignee: Robert Bosch GmbH, Stuttgart, Fed. Rep. of Germany

[21] Appl. No.: 580,832

[22] Filed: Feb. 16, 1984

[30] Foreign Application Priority Data

Feb. 26, 1983 [DE] Fed. Rep. of Germany ....... 3306791

[51] Int. Cl.$^4$ .................. H04N 5/78; G11B 15/14
[52] U.S. Cl. .................................. 360/33.1; 360/64; 360/84
[58] Field of Search ............... 360/33.1, 64, 84, 85

[56] References Cited

U.S. PATENT DOCUMENTS

| 3,580,992 | 5/1971 | Eguchi | 360/64 |
| 4,120,007 | 10/1978 | Sato | 360/64 |
| 4,458,272 | 7/1984 | Heitmann | 360/8 |
| 4,489,354 | 12/1984 | Dann | 360/64 |

OTHER PUBLICATIONS

Apr. 1957, Journal of the SMPTE, vol. 66, pp. 184–188.

Primary Examiner—Aristotelis M. Psitos
Attorney, Agent, or Firm—Frishauf, Holtz, Goodman & Woodward

[57] ABSTRACT

To prevent, cross-talk and other signals from being applied from the magnetic transducer head (6, 7) to an output circuit (12, 13; 28, 29) in a video tape reproduction system, in which one of the heads, only, is in contact with the tape, and the other head runs free, a synchronizing signal recognition stage, responding to the first appearance of a synchronizing signal at one of the heads, is connected to control a switch, typically an electronic switch, to transmit the signals from the specific head to the output circuit and disable signal transfer of any signals from the other one of the heads since those signals, usually, would be noise or disturbance signals. When a synchronizing signal, then, is received from the other head, which previously was disconnected, the circuit switches over to disable the first one and transmit only signals from the second head, so that electronic switching is provided based on recognition of signals transduced from the tape itself, typically and preferably synchronizing words in a digitally recorded TV signal.

4 Claims, 4 Drawing Figures

ROTATING VIDEO HEAD SWITCHING CONTROL SYSTEM

Reference to related applications, assigned to the assignee of the present application, the disclosure of which is hereby incorporated by reference:

U.S. Ser. No. 322,231, filed Nov. 17, 1981 Sochor, now abandoned;

U.S. Ser. No. 323,393, filed Nov. 20, 1981 Heitmann, now U.S. Pat. No. 4,458,272, issued July 3, 1984;

U.S. Ser. No. 510,394, filed June 30, 1983, Heitmann et al.

Reference to related publication:

"Journal of the SMPTE", Vol. 66, April 1957, pp. 184–188.

The present invention relates to a switching system for a rotary video head, in which a plurality of video signal transducers, or transducer heads, are located on a rotating head wheel, rotating within a video head about which video tape is wrapped in a spiral loop.

BACKGROUND

The referenced publication, "Journal of the SMPTE", Vol. 66, pp. 184–188, describes several problems which arise when magnetic heads located on the head wheel of a video drum are to be swtiched, and solutions in connection therewith. During the course of development since this publication in 1957, mechanical signal transfer with slip rings has been replaced by inductive systems, since slip rings and slip ring segments which inherently permit switching, and the consequent slip ring brushes introduce noise signals. Additional difficulties arise in connection with rapid commutation, imperfect or variable contact resistance between brushes and rotating slip rings and the like. Signal transfer, thus, was carried out in non-contactless manner, with electronic circuitry.

One widely used system utilized transverse track recording, with four magnetic transducer heads located on the circumference of a head wheel, in which two transducer heads, each, were interconnected in pairs. The transducer heads usually, were located at diametrically opposite locations on the head wheel, and only one of the transducer heads was in contact with the magnetic tape at any time. A disk, rotating in synchronism with the head wheel, had bright and dark zones or segments located thereon, the number corresponding to the magnetic heads on the head wheel. The differentially optically responsive zones or segments cooperated with a photo cell which generated a square-wave voltage. The squarewave voltage was used to control gate circuitry which, in turn, effected switching the respective magnetic heads at those instants of time during which one television line was followed by another, that is, during the horizontal retrace and blanking interval. It was difficult to suppress noise signals since those magnetic heads which were not in contact with the tape were also connected in circuit. Additionally, difficulties arose in respect to cross-talk due to capacitative and other feedback which occurred, spuriously, upon operation of the system.

It is, of course, possible to electrically separate oppositely located magnetic heads from a common reproduction channel or reproduction signal path. The reproduction quality is enhanced with respect to surious noise signals, cross-talk, and distortion. Yet, the electronic material and circuitry requirements to insure precise switch-over of the respective reproduction channels, each time after rotation of 90° of the head wheel, was large. The respective methods and circuits all required precise construction of the segmental control disk, and alignment of the segments with the segmental control disk, or a control drum. This, in turn, substantially increases the price of an apparatus which is so constructed.

It has also been proposed to substitute electromagnetic scanning rather than electro-optical scanning of the position of the head wheel or, rather, the phase angle of the head wheel with respect to a reference, by associating permanent magnets with the rotating head wheel, and scanning the passage of the permanent magnets by a fixed pick-up tansducer element, such as a pick-up coil.

THE INVENTION

It is an object to simplify signal processing of television (TV) signals derived from a tape which is wrapped at least in part about a pick-up drum, in which signal processing upon reproduction is independent of the geometric conditions and mechanical structures of the apparatus, which is simple, and requires only a minimum of electrical components, while reliably switching output signals with a minimum of noise or cross-talk or distortion superimposed on the desired video signals.

Briefly, the system utilizes the characteristics of television or video signals of including synchronizing signals. In accordance with a feature of the invention, a synchronizing signal recognition circuit is provided which, upon first recognizing a synchronizing signal, controls a switching circuit for switching that one of the magnetic transducer head to an output circuit from which the first synchronizing signal was derived, and disconnect another transducer head from the output circuit to prevent transmission of noise signals from the other transducer head to the output circuit. To prevent spurious switch-over, the first synchronizing signal can be stored.

In accordance with a feature of the invention, the video signals are digitally encoded video signals, in which the synchronizing signals, for example, are synchronizing signal words, readily recognized and separated from video reproduction signals.

The system has the advantage that signal processing, upon reproduction, is independent of the geometric conditions and the mechanical structure of the video magnetic tape transducing apparatus. The synchronizing signals or synchronizing words in digital form are present anyway, and used to control timing error compensation elements, and circuitry is already provided in customary magnetic tape apparatus which are designed for recording and reproduction of digitally coded video signals to recognize the synchronizing words.

The additional material and circuitry required to effect switch-over of transducer heads thus is minimal. Further, a simple transition circuitry is provided which separates the functions of the mechanical rotation of the head wheel, and the reproduction circuitry, which is entirely electronic, since only signals which are already derived from the tape are being processed; no interference with the mechanical operation of the head wheel is needed.

DRAWINGS

Figure 1:
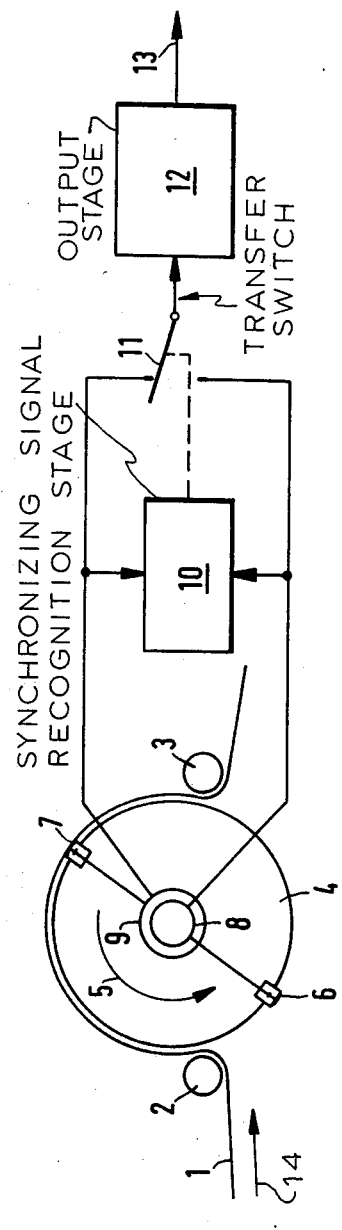
FIG. 1 is a block circuit diagram illustrating the basic circuit arrangement used with inclined track recording of video signals on a magnetic tape, spirally passed about a transducing drum.
Figure 2:
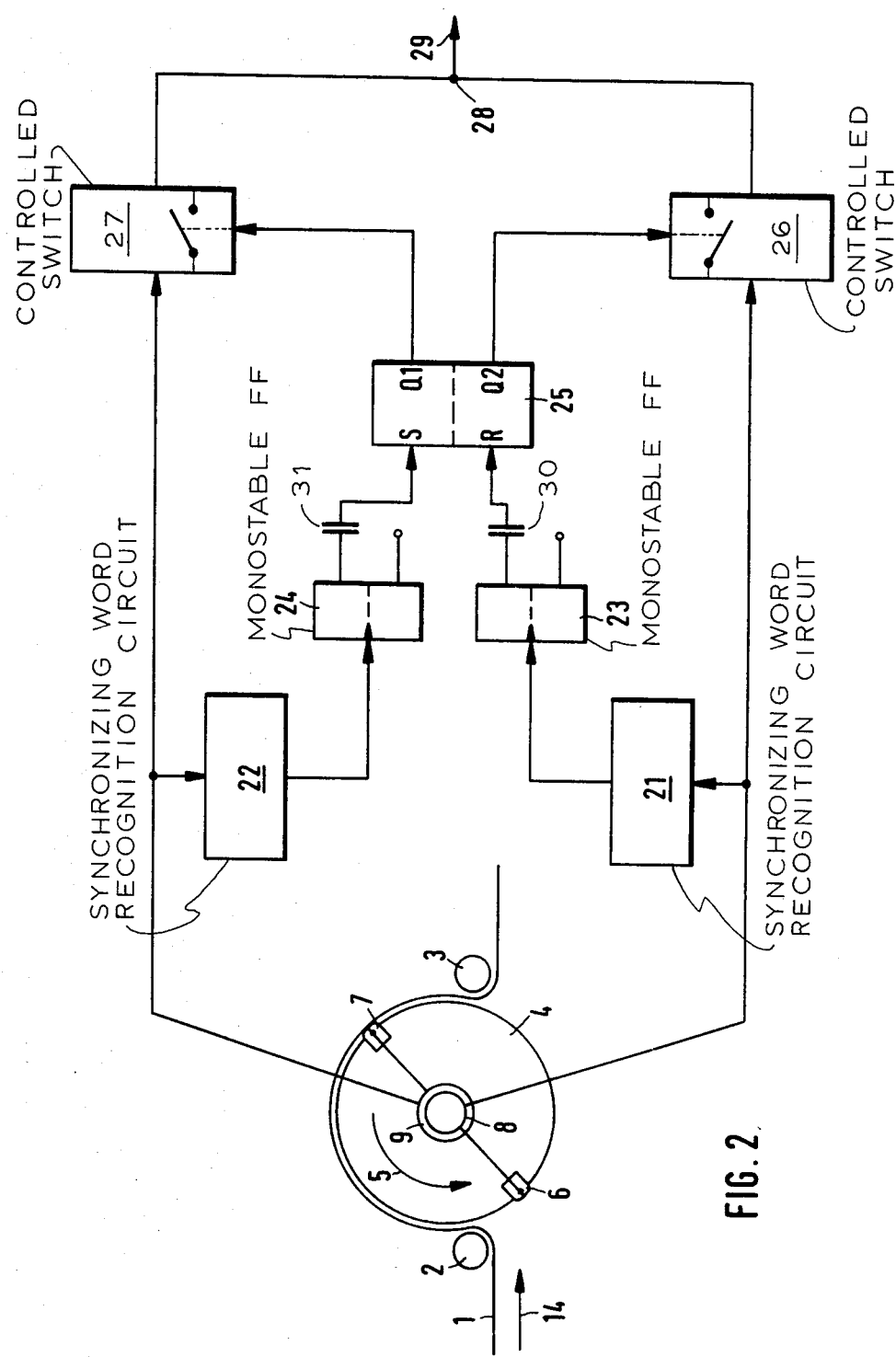
FIG. 2 is a more detailed block diagram of the basic circuit of FIG. 1.
Figure 3:
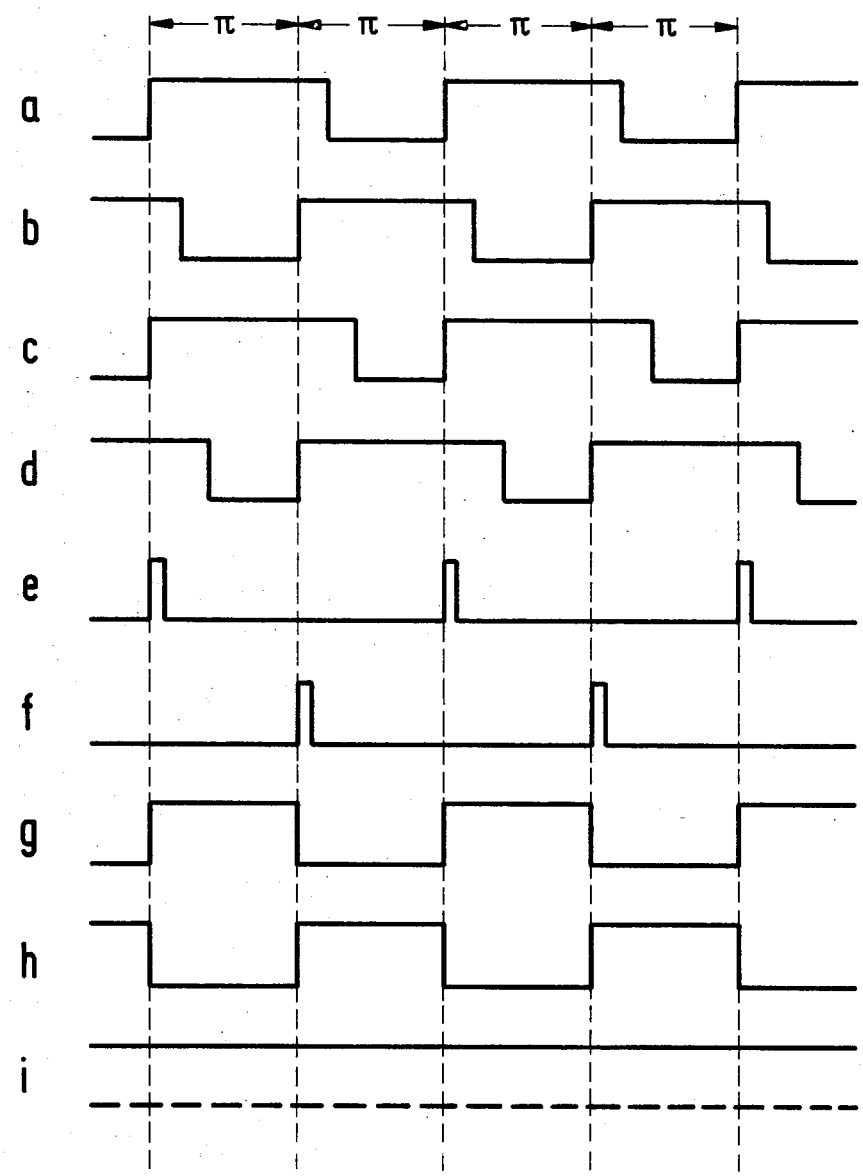
Figure 4:
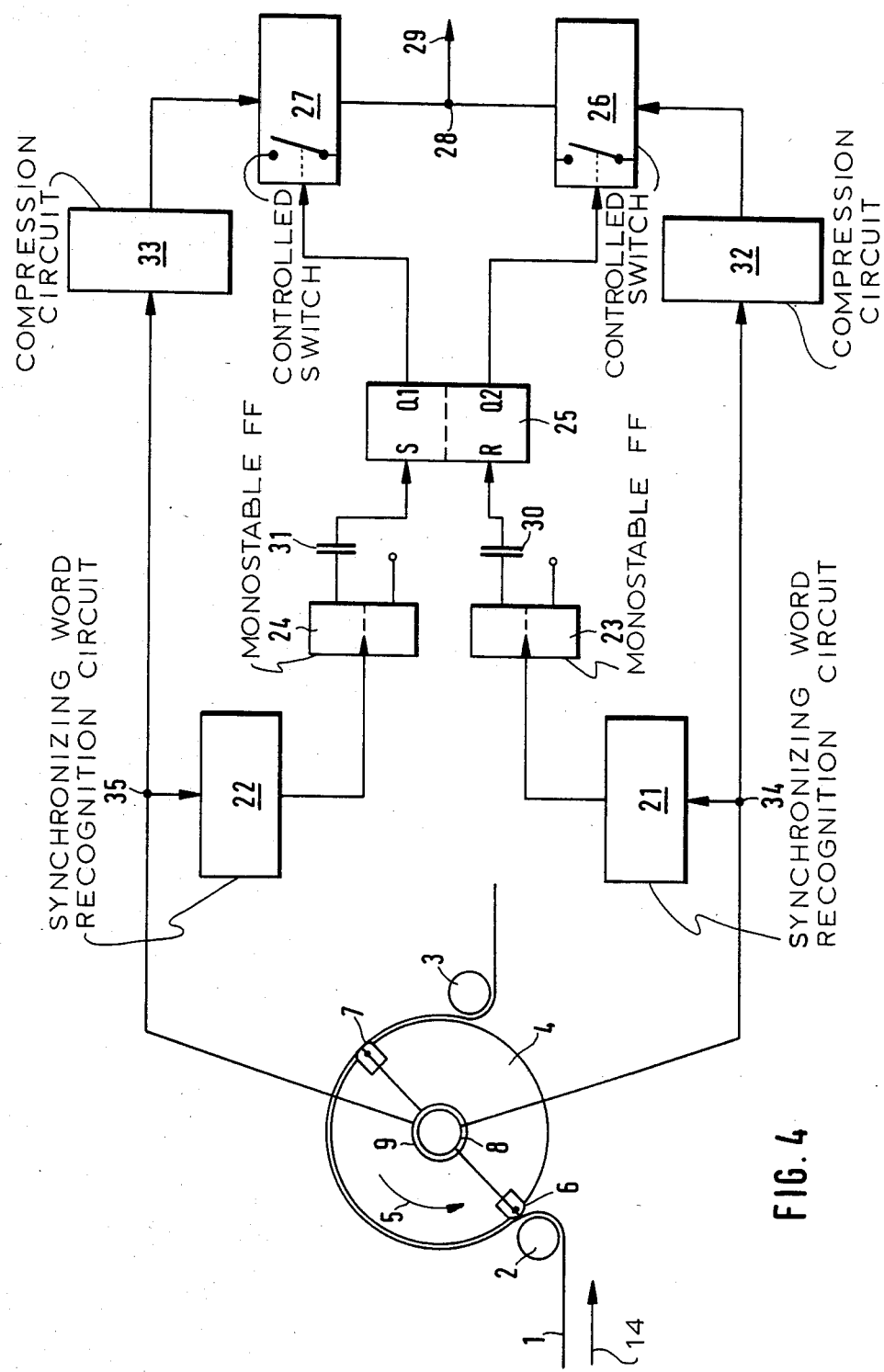

FIG. 3, including A-J, is a timing diagram to illustrate the operation of the circuit of FIGS. 1 and 2; and FIG. 4 is a block diagram of yet another embodiment of the basic system of FIG. 1.

DETAILED DESCRIPTION

Referring to FIG. 1: A magnetic tape 1 is guided by suitable guide rollers 2, 3 in a spiral path about a cylindrical scanning drum, which has a head wheel 4 rotating therein, as schematically shown by arrow 5. Two transducer heads 6, 7 are located on the head wheel 4, positioned diametrically opposite each other. More than two transducer heads may be used. Due to the spiral passage of the tape 1 about the drum, the heads 6, 7 will scan the tape in inclined tracks, in the form of parallel tracks extending at an angle with respect to the longitudinal extent of the tape, as is well known.

The heads 6, 7 are used to transduce electrical signals from the magnetic pattern on the tape 1 and to provide signals representative of the electrical signals which were, originally, used to record on the tape. The wrap angle of the tape, preferably, is more than 180°, for example 190°. Due to the wrap angle being more than half circumference, some overlap in operation will result between the two transducer heads 6, 7. In a range of about 10° of rotation of the head wheel 4, both transducer heads 6, 7 will be in transducing contact with the tape. Consequently, electrical signals which are supplied from the transducer heads will have some degree of redundancy.

Upon switching the system to reproduction mode, it has been found desirable to connect only one of the heads 6, 7 respectively to an output reproducing circuit, so that signals will be derived only from the magnetic head which will be in contact with the magnetic tape and scan that track which is to be reproduced. The remaining magnetic heads should be separated from the output circuit. This separation permits substantial reduction of noise signals derived from the magnetic heads which do not, at that time, scan a track which is intended to be reproduced. Consequently, the relationship of desired output signal and noise signal is improved. During the interval of overlap, when both magnetic heads are in contact with the tape, it is possible that phase errors arise between the signals from the respective magnetic transducer heads, causing a distorted image. Such phase angle errors can result due to improper alignment of the magnetic heads on the head wheel, for example positioning of the respective head wheels not precisely diametrically, 180° apart; changes in tape length, due to variations of temperature, ambient humidity, or the like; or other interfering parameters, difficult to predict and to compensate.

In accordance with a feature of the invention, the switch-over between reproduction from the respective magnetic heads 6, 7 is carried out during the period when both of the magnetic heads 6, 7 are in contact with the tape 1. Magnetic transducers are usually used in order to transduce electrical signals from the rotating portion of video magnetic tape recorders. In FIG. 1, two such transducers are shown at 8, 9. They are contactless and operate on the basis of air gap transformers. Their structure is well known in the art, and any suitable and desired system and arrangement may be used.

The reproduction circuitry has an evaluation circuit 10 which is designed to recognize and evaluate synchronizing signals or, rather, in digitally recorded TV signals, synchronizing signal words which arise in the signal train received from the heads 6, 7. The synchronizing signal recognition circuit or stage 10 recognizes a synchronizing signal or, in digital TV recording, a synchronizing word, and controls a transfer switch 11. Transfer swtich 11 is shown in FIG. 1 as a mechanical transfer switch; in actual construction, it would, preferably, be a semiconductor transfer switch, or two alternately conducting and blocking semiconductor elements, such as transistors. The circuit or stage 10 which recognizes a synchronizing word is well known in the technology of digital signal processing. A signal processing output circuit or stage 12 receives the signals from the transfer switch 11, in which the signals received and transduced from the magnetic tape are suitably processed, in accordance with any well known and desired processing characteristics, and then applied to an output terminal 13 of the transducing system. The output circuit 12 does not form subject matter of the present application, and may be in accordance with any well known and standard circuit or structure.

The synchronizing signal recognition stage or circuit 10 is shown in greater detail in FIG. 2. Tape 1 is moved in the direction of the arrow 14, and the guide rollers 2, 3 loop the tape about the head wheel 4 at an angle of over 180°. The synchronizing signal recognition stage 10 includes two blocks 21, 22, each one containing a synchronizing word recognition circuit. The synchronizing word recognition circuit 21 receives signals from the transducer head 6 via the transformer 8. The signals received will be a train of signals which include the synchronizing words. The synchronizing word recognition circuit 22 receives its signals from transducer head 7 via transformer 9. The circuits 21, 22 can be similar to those described in the above referred to application Ser. No. 510,394, Heitmann, Loos and Muller, now abandoned, assigned to the assignee of the present application. Upon recognizing a synchronizing word or synchronizing signal, the output from the respective circuits 21, 22 will be a 1-signal or "high" (H). The outputs of the synchronizing circuits 21, 22 are each connected to the input of a monostable flip-flop (MFF) 23, 24, respectively. The direct outputs of the MFFs 23, 24 are connected through respective coupling capacitors 30, 31 to the RESET and SET inputs R, S of a bistable resettable flip-flop (FF) 25.

The signal currents which are supplied to the respective synchronizing word recognition circuits 21, 22 are, further, applied to controlled switches 26, 27. The control input to the switch 26 is derived from the output Q2 of FF 25; the control input of switch 27 is derived from the output Q1 of the set-reset, RS flip-flop 25. The outputs of the switches 26, 27 are combined in a combining circuit, of any suitable and well known construction, shown schematically only as a junction 28, for connection to a common output 29 of the overall circuit, which, then, will provide a continuous signal. The MFFs 23, 24 can be constructed as a single integrated circuit (IC), for example of the type SN74LS123. The switches 26, 27 can be constructed as individual elements, or combined, for example of the types SN74LS157, SN74LS244, or SN74LS374.

Operation of circuit of FIG. 2, with reference to the timing diagram of FIG. 3, in which the respective graphs are drawn to a common horizontal time axis:

The envelopes of the pulses of the curves or signals derived from the respective heads 6, 7 are shown in graphs a and b of FIG. 3. The graph of line a, for example, corresponds to the signals derived from the head 6, and the graph of line b to the signals from head 7. Due to the wrap angle of the tape 1 about the head wheel 4 which is greater than 180°, and the offset of the transducer heads by 180°, or $\pi$, the graphs of the respective heads which are in contact with the tape will have a signal content which is greater than $\pi$ and the head which is not in contact with the tape will have a signal content less than $\pi$. The signal portions of each of the signals will have synchronizing words contained therein. Upon recognition of a synchronizing word within the signal train, or signal envelope, according to graphs a and b, one, or the other, of the monostable FFs 23, 24 will be newly started. The monostable FFs 23, 24 are of the type that they can be retriggered, for example by a common element SN74LS123. The respective numbers refer to the number of the ICs by Texas Instruments. The external circuitry is so selected that the output signal will have a time duration which extends until the occurrence of the next synchronizing word or synchronizing signal within the timing period in accordance with the graphs a or b of FIG. 2. Consequently, the timing periods of the graphs c and d, which correspond to the output signals of the respective MFFs 23, 24, are slightly longer than the signals of the graphs a and b. By differentiating in the capacitors 30, 31 which, in effect, form differentiating stages, the rising flanks of the signal trains or graphis c and d will generate trigger pulses, shown in graphs e and f of FIG. 3, and applied to the RS-FF 25.

The pulses, as illustrated in graphs e and f, are offset with respect to each other by 180° or $\pi$. They are applied to the input of the RS-FF 25 offset by the angle $\pi$ so that its output Q1 will have the signals corresponding to the graph g of FIG. 3, and the output Q2 will have the signals corresponding to the graph h of FIG. 3. The swtiches 26, 27 then are connected in synchronism with the signals in accordance with the graphs g and h, and at the junction 28, and hence the output 29 of the overall circuit, a continuous signal train in accordance with the graph i of FIG. 3 will be obtained. Consequently, the output 29 will have a continuous signal, containing both the synchronizing signals as well as the image signals derived from the transducer which is in continous contact with the tape and starting, each time, with the synchronzing signal.

Switches 26, 27, if utilizing the structures SN74LS244 or SN74LS374 from Texas Instruments, have the additional advantage that, if a signal is present at the control input, the output from the respective switch is, automatically, a low-resistance or low-ohm output; upon absence of a signal, the output is high-resistance or high-ohm, so that complete separation from the input circuit is insured.

Embodiment of FIG. 4: The system of FIG. 4 is particularly adapted to swtich over transducer heads of a video magnetic tape recording apparatus with storage of a plurality of recording channels of narrow band width, in which the video data to be stored are time-expanded before recording. The wrap angle of the magnetic tape 1 is increased by the factor of expansion. The head wheel, again, has two transducer heads 6, 7 located thereon. The expansion factor may, for example, be 1.5, so that the wrap angle will be 270° (180°×1.5=270°). The circuit is, in general, similar to that explained in connection with FIGS. 2 and 3, and operates similarly; the only addition is the connection of two compression circuits 32, 33 in the circuit path between junctions 34, 35, from which the synchronizing word recognition circuits are branched. The time compression circuits 32, 33 compensate for expansion prior to recording. The compression circuit 32 is connected between junction 34 and the controlled switch 26. The compression circuit 33 is connected between junction 35 and switch 27. Compression is carried about by a factor which is reversely proportional to the prior expansion factor. By compression by this factor, inversely proportional to prior expansion, loss of significant information portions upon switch-over between the two reproducing channels is effectively prevented.

The system of time-expansion of TV signals, including increasing the wrap angle of the tape about the transducer drum, is explained in greater detail in the referenced U.S. applications Ser. No. 322,231, filed Nov. 17, 1981, Sochor, now abandoned and Ser. No. 323,393, filed Nov. 20, 1981, Heitmann now U.S. Pat. No. 4,458,272.

I claim:

1. Rotating video head switching control system having
   a rotating head wheel (4) carrying at least two transducer heads (6, 7) for transducing video signals from a tape (1) into electrical signal words including video image signals and synchronizing signals;
   an output circuit (12, 13; 28, 29) for transmitting the transduced signal words for further processing;
   synchronizing signal recognition circuit means (10, 21, 22), for recognizing the presence of synchronizing signals in the siganl words, coupled to the transducer heads;
   controlled switching means (11, 26, 27) for selectively switching one of the transducer heads (6, 7) to the output circuit and for steering the signal derived from one of the transducer heads for further processing,
   and wherein, in accordance with the invention,
   the synchronizing signal recognition circuit means (10, 21, 22) are connected to control, upon first recognizing a synchronizing signal, the controlled switching means (11, 26, 27) for switching, into connection with the output circuit, that one of the magnetic-transducer heads, from which the first synchronizing signal was derived, and for steering the signal words to the output circuit, and
   disconnecting at least one other transducer head from the output circuit, to prevent transmission of noise signals from the other transducer head to the output circuit.

2. System according to claim 1, further comprising compression circuits (32, 33) located in the signal paths between the respective recording heads (6, 7) on the head wheel and the controlled switching means (26, 27) to compensate for time expansion of video data recorded on the tape (1).

3. System according to claim 1, wherein the synchronizing signals comprise sequences of digital-bits, namely synchronizing words.

4. System according to claim 1, including switchable memory means (25) coupled to the synchronizing signal recognition circuit means (21, 22) for responding to the first synchronizing pulse from any one magnetic transducer head.

* * * * *